United States Patent
Genc et al.

(10) Patent No.: US 11,900,244 B1
(45) Date of Patent: Feb. 13, 2024

(54) ATTENTION-BASED DEEP REINFORCEMENT LEARNING FOR AUTONOMOUS AGENTS

(71) Applicant: Amazon Technologies, Inc., Seattle, WA (US)

(72) Inventors: Sahika Genc, Mercer Island, WA (US); Sravan Babu Bodapati, San Francisco, CA (US); Tao Sun, Bellevue, WA (US); Sunil Mallya Kasaragod, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1070 days.

(21) Appl. No.: 16/588,789

(22) Filed: Sep. 30, 2019

(51) Int. Cl.
*G06N 3/08* (2023.01)
*G05D 1/02* (2020.01)
*G06F 17/16* (2006.01)
*G06F 16/904* (2019.01)

(52) U.S. Cl.
CPC .............. *G06N 3/08* (2013.01); *G05D 1/0221* (2013.01); *G06F 16/904* (2019.01); *G06F 17/16* (2013.01); *G05D 2201/0213* (2013.01)

(58) Field of Classification Search
CPC ........ G06N 3/08; G06N 20/00; G05D 1/0221; G05D 2201/0213; G06F 16/904; G06F 17/16
See application file for complete search history.

(56) References Cited

U.S. PATENT DOCUMENTS

| | | | |
|---|---|---|---|
| 6,169,981 B1 * | 1/2001 | Werbos | G05B 13/0285 706/26 |
| 9,760,806 B1 * | 9/2017 | Ning | B60W 50/14 |
| 10,235,881 B2 * | 3/2019 | Nishi | G08G 1/161 |
| 10,766,137 B1 * | 9/2020 | Porter | B25J 9/161 |
| 10,872,294 B2 * | 12/2020 | Vecerik | G06F 17/18 |
| 10,926,408 B1 * | 2/2021 | Vogelsong | B25J 9/1671 |
| 10,940,863 B2 * | 3/2021 | Palanisamy | G06N 3/045 |
| 11,657,268 B1 * | 5/2023 | Refaat | G06N 3/04 706/18 |
| 2008/0071136 A1 * | 3/2008 | Oohashi | G10H 7/00 600/27 |

(Continued)

FOREIGN PATENT DOCUMENTS

| | | | | |
|---|---|---|---|---|
| CN | 109284812 A | * | 1/2019 | ............. A63F 13/67 |
| CN | 110023962 A | * | 7/2019 | ......... G06K 9/00335 |
| WO | WO-2022023385 A1 | * | 2/2022 | |

OTHER PUBLICATIONS

Nazari, Mohammadreza, et al. "Deep reinforcement learning for solving the vehicle routing problem." arXiv preprint arXiv: 1802. 04240 (2018). (Year: 2018).*

(Continued)

*Primary Examiner* — Angelina Shudy
(74) *Attorney, Agent, or Firm* — Robert C. Kowert; Kowert, Hood, Munyon, Rankin & Goetzel, P.C.

(57) ABSTRACT

A data source configured to provide a representation of an environment of one or more agents is identified. Using a data set obtained from the data source, a neural network-based reinforcement learning model with one or more attention layers is trained. Importance indicators generated by the attention layers are used to identify actions to be initiated by an agent. A trained version of the model is stored.

20 Claims, 9 Drawing Sheets

(56) References Cited

U.S. PATENT DOCUMENTS

| | | | | |
|---|---|---|---|---|
| 2019/0035275 | A1* | 1/2019 | Nishi | G08G 1/166 |
| 2019/0304104 | A1* | 10/2019 | Amer | G06T 13/80 |
| 2019/0369627 | A1* | 12/2019 | Green | B61L 27/60 |
| 2019/0384304 | A1* | 12/2019 | Towal | G06N 3/045 |
| 2020/0010084 | A1* | 1/2020 | Pathak | G06V 20/588 |
| 2020/0017117 | A1* | 1/2020 | Milton | B60W 50/02 |
| 2020/0033869 | A1* | 1/2020 | Palanisamy | G06N 5/043 |
| 2020/0089245 | A1* | 3/2020 | Yadmellat | B60W 60/0011 |
| 2020/0139973 | A1* | 5/2020 | Palanisamy | G08G 1/167 |
| 2020/0142421 | A1* | 5/2020 | Palanisamy | B60W 60/001 |
| 2020/0166942 | A1* | 5/2020 | Kwatra | G05D 1/0221 |
| 2020/0167686 | A1* | 5/2020 | Mallya Kasaragod | B25J 9/1605 |
| 2020/0174486 | A1* | 6/2020 | Luo | G05D 1/0088 |
| 2020/0241542 | A1* | 7/2020 | Sung | G06N 3/088 |
| 2020/0242381 | A1* | 7/2020 | Chao | G06N 20/00 |
| 2020/0279483 | A1* | 9/2020 | Eather | G06T 11/006 |
| 2020/0285243 | A1* | 9/2020 | Morita | G05D 1/0221 |
| 2020/0293054 | A1* | 9/2020 | George | G06N 20/00 |
| 2020/0334862 | A1* | 10/2020 | Hara | G06T 7/74 |
| 2020/0372366 | A1* | 11/2020 | Badia | G06N 3/04 |
| 2020/0394562 | A1* | 12/2020 | Nonaka | B60W 50/00 |
| 2020/0401150 | A1* | 12/2020 | Gong | G05D 1/0088 |
| 2021/0012567 | A1* | 1/2021 | Zhang | G06T 7/10 |
| 2021/0019642 | A1* | 1/2021 | O'Malia | G06F 40/279 |
| 2021/0034970 | A1* | 2/2021 | Soyer | G06N 3/0454 |
| 2021/0110115 | A1* | 4/2021 | Hermann | G06N 3/0454 |
| 2021/0163021 | A1* | 6/2021 | Frazzoli | B60W 50/02 |
| 2021/0201053 | A1* | 7/2021 | Gou | G06N 5/04 |
| 2021/0263526 | A1* | 8/2021 | Helbig | G05B 13/04 |
| 2021/0312725 | A1* | 10/2021 | Milton | G06N 3/0454 |
| 2021/0334671 | A1* | 10/2021 | Minsky | G06F 16/3329 |
| 2022/0035878 | A1* | 2/2022 | Sarah | G06N 3/082 |
| 2022/0036194 | A1* | 2/2022 | Sundaresan | G06N 3/063 |
| 2022/0066460 | A1* | 3/2022 | Ivanovic | G06F 18/214 |
| 2022/0121961 | A1* | 4/2022 | Chen | G06N 3/00 |
| 2022/0157165 | A1* | 5/2022 | Dantrey | G06N 3/0481 |
| 2022/0161423 | A1* | 5/2022 | Perez | G06N 20/00 |
| 2022/0168899 | A1* | 6/2022 | Boroushaki | B25J 9/1671 |

OTHER PUBLICATIONS

L. Chen, Y. He, Q. Wang, W. Pan and Z. Ming, "Joint Optimization of Sensing, Decision-Making and Motion-Controlling for Autonomous Vehicles: A Deep Reinforcement Learning Approach," in IEEE Transactions on Vehicular Technology, vol. 71, No. 5, pp. 4642-4654, May 2022, doi: 10.1109/TVT.2022.3150793. (Year: 2022).*

Yilun Chen, Chiyu Dong, Praveen Palanisamy, Priyantha Mudalige, Katharina Muelling, John M. Dolan; Attention-based Hierarchical Deep Reinforcement Learning for Lane Change Behaviors in Autonomous Driving, 2019 (Year: 2019).*

Cao, Qingxing, et al. "Attention-aware face hallucination via deep reinforcement learning." Proceedings of the IEEE conference on computer vision and pattern recognition. 2017. (Year: 2017).*

* cited by examiner

ATTENTION-BASED DEEP REINFORCEMENT LEARNING FOR AUTONOMOUS AGENTS

BACKGROUND

In recent years, machine learning techniques, including so-called deep learning techniques which involve the use of multi-layer neural networks, are being applied to more and more problem domains. Machine learning approaches may broadly be divided into the following categories: supervised learning, unsupervised learning, and reinforcement learning. In supervised learning, a model is trained using labeled data examples, for each of which the label or "correct" output is provided, and the model eventually learns to predict the labels for data that was not used during training. In unsupervised learning, the model learns previously undiscovered patterns in unlabeled data—e.g., an unsupervised learning algorithm may identify clusters of similar example records in a data set without being provided guidance regarding the specific properties to be used to classify the records. In reinforcement learning, the emphasis is on learning a solution to a problem or targeted task (such as how to win a game, or how to navigate a robot) using a balance between the current knowledge available regarding the state of a target environment and the exploration of available un-tried actions within that environment.

In order to train a reinforcement learning model, simulations of the real-world environment in which a task is to be performed may be used. For example, a simulation of a warehouse environment may be used to train a model to be used to guide the operations of an autonomous robot which is to transfer inventory items from their current locations for optimized delivery. In some cases, considerable effort may be devoted to making the simulations as realistic as possible, so that the learning achieved via the simulation can be transferred effectively to the environments in which the model is eventually to be deployed. Nevertheless, simulations may not be able to capture all the relevant subtle details and variations observed in real deployment environments, especially for complex tasks such as navigating vehicles and the like.

A model trained using a simulation may perform poorly when there is a mismatch between the simulation and its real-world deployment environment. Such poor performance may arise due to a variety of reasons, including but not limited to uncertainties in system parameters, unknown or un-modeled dynamics, or measurement errors associated with sensors. Training reinforcement learning models that are able to adapt to non-trivial variations in real-world environments remains a challenging technical problem.

Figure 1:
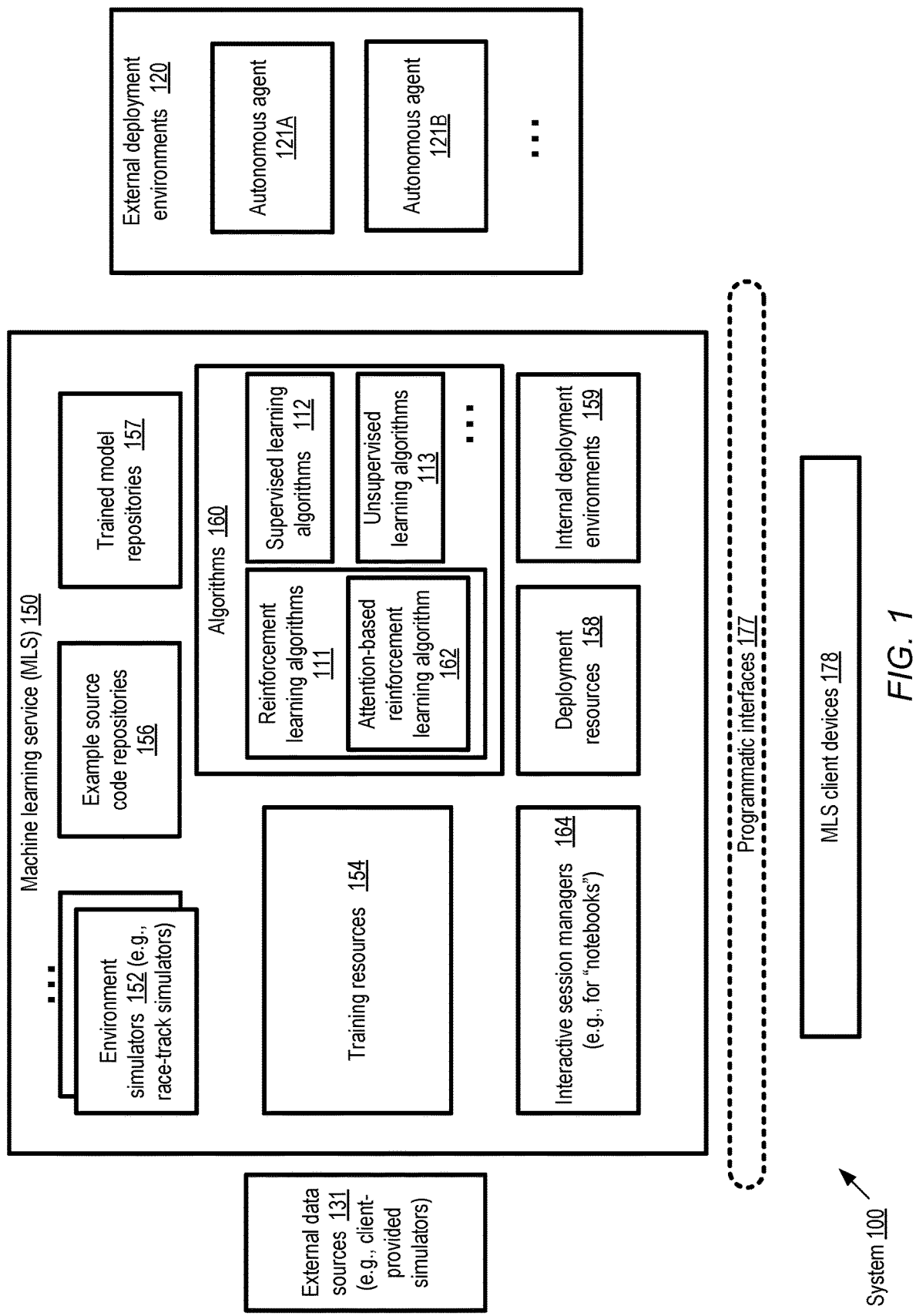
FIG. 1 illustrates an example system environment in which attention-based reinforcement learning models may be trained, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for generating and using neural-network based reinforcement learning models comprising attention layers for increased generalizability and knowledge transfer across simulation and real-world environments, applicable in a variety of domains including navigation of autonomous agents, are described. At a high level, attention mechanisms, implemented at one or more layers of nodes of an artificial neural network in various embodiments, may learn to assign indicators of relative importance (with respect to the eventual selection of actions by the reinforcement learning model) to various features detected in an environment considered as a whole, and to provide such importance indicators as part of a latent representation of the environment to those portions of the model at which reward-based actions are selected. As suggested by their names, the attention layers of a reinforcement learning model (RLM) may in effect provide guidance to decision-making layers of the model regarding the relative amount of "attention" to be given to various elements of the environment when determining the correct action to be taken. The terms "attention layer" and "attention mechanism" may be used interchangeably in various embodiments, and neural network-based RLMs that comprise attention layers may be referred to as attention-based RLMs or ARLMs in at least some embodiments.

Unlike some other neural network-based mechanisms, such as long short-term memory units (LSTMs) or gated recurrent units (GRUs) which are designed to operate on subsets of the input in sequential chunks (e.g., in a machine translation application, on one word of a sentence at a time), attention layers may often be designed to consume representations of all (or at least a large subset of) the input available. For example, in a machine translation application, all the words of the sentence to be translated may be analyzed together at an attention layer, instead of examining one word at a time. Because of this more holistic approach, RLMs with attention layers may be able to learn to distinguish between more globally salient aspects of the environment and those aspects that are less relevant to the task at hand, and thus may be more effective in transferring learning between training phases of the model (where simulations are used for input) and production execution phases of the trained version of the model. As such, more optimal actions may be selected by such RLMs for autonomous agents, and less effort may be required to tune or adjust the RLMs for real world use (or for use in a different simulator environment than was used for the training). The task of generalizing a model to enable it to be used successfully across different environments is referred to as "domain adaptation", and the effort and resources required for domain adaptation may be substantially reduced by introducing appropriately configured attention layers in various embodiments.

In some embodiments, a network-accessible machine learning service (MLS) may provide various resources, artifacts, or tools that may be used by clients to design, develop and deploy attention-based RLMs. The MLS may for example provide a number of programmatic interfaces (e.g., web-based consoles, graphical user interfaces, visualization tools, interaction sessions or workbooks, command-line tools, application programming interfaces (APIs) and the like) that can be used by clients to initiate machine learning model training, testing, evaluation, deployment and the like. In at least one embodiment, such an MLS may be implemented at a provider network or cloud computing environment.

According to one embodiment, a system may comprise one or more computing devices, e.g., including respective hardware and software components collectively used to implement various functions of an MLS. The computing devices may include instructions that upon execution on or across one or more processors cause the one or more computing devices to identify, based at least in part on a first programmatic interaction with a client, a simulator of an environment of one or more autonomous agents. The simulator may represent one example of a data source used to provide feedback about changes in the environment resulting from actions initiated by the autonomous agents, which can then be used to compute the benefits/rewards associated with various actions; other types of data sources (e.g., data collected from sensors) may be used in some embodiments. In some embodiments, a collection of simulators may be provided by the MLS, and MLS clients may select which particular simulator or simulators are to be used to train an RLM.

The computing devices may be used to train a neural network-based reinforcement learning model using at least a pixel-level data set obtained from a selected simulator as input in various embodiments. In other embodiments, the data set may not necessarily include pixel-level details, and/or may include non-visual data (such as representations of sounds, radar signals, and the like). The neural network-based reinforcement learning model may include at least (a) a perception sub-model with one or more attention layers and (b) a dynamics sub-model (which may also be referred to as a policy sub-model) in some embodiments. The perception sub-model, as indicated by its name, may consume the data set representing the environment as input, and attempt to identify or perceive various features (e.g., inanimate objects, other autonomous agents, etc.) within the environment. The output produced by the perception sub-model may comprise a latent or transformed representation of the environment of the autonomous agent, and may include relative importance indicators assigned by the attention layers to respective elements of the environment in various embodiments. The dynamics sub-model may identify one or more actions to be initiated by an autonomous agent based on output generated by the perception sub-model, and send signals to initiate the actions to one or more simulated or real actuators of an autonomous agent. In one embodiment, the dynamics sub-model may include one or more attention layers, e.g., used in combination with a recurrent neural network to identify optimal actions or combination of actions. In another embodiment, attention layers may be used at the dynamics sub-model and not at the perception sub-model. In at least some embodiments, the perception sub-model and the dynamics sub-model may be trained jointly, e.g., in contrast to some approaches where models for transforming or encoding the environment are trained separately from the models responsible for using the encoded/transformed representations to select actions to be initiated. The attention layers may implement any of several techniques in different embodiments, such as multi-layer perceptron or additive attention, and/or dot-product (multiplicative) attention. To identify the actions at the dynamics sub-model, in at least some embodiments a pixel-level image-based error function (e.g., an error function that compares a desired image to an actual image) may be used. In some embodiments, as indicated above, the training input data for the model may be multi-modal—e.g., it may include a combination of visual representations of the environment, audio representations, weather-related data indicative of the environment, and so on.

After the attention-based RLM (ARLM) has been trained, the trained version may be stored in various embodiments, e.g., at a repository maintained at an MLS. In at least some embodiments, based at least in part on another programmatic interaction with a client, the trained version of the model may be transmitted to a target autonomous agent, e.g., to be operated in a non-simulation environment. There, the trained ARLM may be executed, and actions of the target autonomous agent may be initiated using the ARLM.

Depending on the application or type of autonomous agent for which the ARLM was trained, a wide variety of actions may be initiated in different embodiments. For example, the movements or navigation of an autonomous or semi-autonomous vehicle may be planned or controlled using the ARLM, the movements of a robotic device may be initiated, an aerial or underwater drone may be propelled or operated, and/or various moves or actions of a virtual or physical game may be initiated. The term "autonomous vehicle" may be used broadly herein to refer to vehicles for which at least some motion-related decisions (e.g., whether to accelerate, slow down, change lanes, etc.) may be made, at least at some points in time, without direct input from the vehicle's occupants. In various embodiments, it may be possible for an occupant of such a vehicle to override the decisions made by the vehicle's reasoning or decision making components using an ARLM, or even disable such components at least temporarily; furthermore, in at least one embodiment, a decision-making component of the vehicle may request or require an occupant to participate in making some decisions under certain conditions.

A number of different types of sensors may be used to provide input to the perception sub-model in various embodiments, e.g., after the model has been trained and deployed. Such sensors may include, for example, a still camera, a video camera, a radar device, a LIDAR (light detection and ranging) device, an audio signal sensor such as a microphone, or a weather-related sensor (such as a wind sensor, a temperature sensor, an air-pressure sensor, etc.). In at least one embodiment, a simulator used to train the ARLM may also include simulations of one or more such sensors, that is, the simulated data fed to the ARLM's perception sub-model during training may also include multi-modal output produced by simulated cameras, radar devices, etc.

Convolutional neural networks (CNNs) have been used for a variety of applications in recent years, including object recognition. Typically CNNs may include several convolution layers (which in effect examine adjacent regions of an image), pooling layers (which combine outputs from convolution layers), and or fully-connected layers arranged in a sequence. Convolution layers may capture local dependencies within input images, e.g., to help recognize edges or boundaries between objects, and the sequence of convolution layers of a CNN may gradually build up higher-level objects by aggregating such lower-level constructs. In at least some embodiments, the perception sub-model of the ARLM may also include one or more convolution layers, e.g., with individual attention layers associate with respective convolution layers. In one embodiment in which the ARLM comprises a convolution layer, the ARLM may not include pooling layers of the type often used in conventional CNNs, as the attention layers may not need to access pooled or aggregated information.

In some embodiments, a training request may be submitted by a client of an MLS via a programmatic interface to initiate the training of the ARLM using MLS resources. In some embodiments, the MLS may provide example or template code for training an ARLM, which may be modified by an MLS client as desired to generate a customized program to train the client's ARLM. In at least one embodiment, a training request may include various meta-parameters such as the criterion to be used to terminate training, the layout (number of layers, number of nodes per layer etc.) of the ARLM, the specific reward function to be used, the dimensionality of the input data and/or the outputs produced by the ARLM, and so on.

According to some embodiments, a visual representation of the importance assigned to different aspects or elements of the autonomous agent's environment (during training and/or after training is complete and the model has been deployed) may be provided to an MLS client. For example, in a scenario in which navigation actions of an autonomous vehicle are chosen based on the ARLM's output, heat maps of the images of the environment, showing which parts of the environment were assigned greater significance/importance relative to others with respect to the navigation actions, may be provided via such visualization interfaces. In effect, using such interfaces, visual representations of the importance indicators assigned by the attention layers during various stages of training and post-training execution may be provided, which may be beneficial in interpreting the operations of the ARLM.

As one skilled in the art will appreciate in light of this disclosure, certain embodiments may be capable of achieving various advantages and practical applications/benefits, including some or all of the following: (a) reducing the amount of computation, storage, memory and other resources required to prepare an RLM for accomplishing complex real-world tasks such as navigation of autonomous agents substantially, e.g., by eliminating or largely eliminating work typically needed to adapt an RLM from its training domain to its deployment domains or train the RLM with diverse input data sources and/or (b) enhancing the user experience of data scientists and other users of RLMs, e.g., by providing easy-to-understand insights (e.g., via visualization interfaces in which importance indicators assigned by attention layers of the model are displayed superimposed on a view of the environment) into which elements of the environment are assigned more significance when taking action decisions.

Example System Environment

FIG. 1 illustrates an example system environment in which attention-based reinforcement learning models may be trained, according to at least some embodiments. As shown, system 100 includes resources and artifacts of a machine learning service (MLS) 150 which may provide facilities for clients to train and deploy various types of machine learning models. The MLS may implement one or more programmatic interfaces 177, such as web-based consoles, graphical user interfaces (including visualization interfaces for viewing model results or internal data generated at the model), command-line tools, application programming interfaces (APIs) and the like. Clients of the MLS may submit various types of machine learning-related requests to the MLS from client devices 178 (e.g., laptops, desktops, mobile computing devices and the like) in the depicted embodiment, including for example requests to train models, test/evaluate models, deploy models, view intermediate or final results of models, view importance indicators and/or other values generated internally in the model, and the like. In at least some embodiments, the MLS 150 may provide support for interactive sessions called "notebooks" which may be used by clients to prepare and process input data for machine learning models, initiate training, annotate/record various activities performed during the sessions, and so on. In some embodiments, dedicated virtual machines or compute instances may be configured as interactive session managers 164 at the MLS.

The MLS 150 may enable clients to utilize various types of machine learning algorithms to train models in the depicted embodiment using training resources 154. The collection of algorithms 160 may include supervised learning algorithms 112, unsupervised learning algorithms 113 as well as reinforcement learning algorithms 111. A subset of models may be trained at the MLS using an attention-based reinforcement learning algorithm 162. In some embodiments, the MLS 150 may include example source code repositories 156 comprising customizable source code for training various types of models, and MLS clients may use the provided source code as templates or starting points for their modeling efforts.

The MLS 150 may provide one or more environment simulators 152 in the depicted embodiment, which may be used to train reinforcement learning models at the request of MLS clients. In some embodiments, clients may specify external data sources 131 including alternative environment simulators which may be used to train models. Training resources 154 of the MLS 150 may include one or more special-purpose servers (e.g., servers equipped with highend graphical processing units (GPUs)) optimized for training deep neural networks in some embodiments. After a given model is trained, it may be stored in a model repository 157 in the depicted embodiment in response to a programmatic request from a client or by default. In response to a deployment request received from a client via programmatic interfaces 177, a trained version of a model may be deployed to one or more target deployment environments (e.g., external deployment environments 120, or internal deployment environments 159 within the MLS) where the model may be run to implement applications on behalf of the MLS clients. Individual components of the MLS 150 shown in FIG. 1, including the training resources 154, the deployment resources 158, the environment simulators 152 and the like may comprise one or more computing devices in various embodiments. In some embodiments, some of the functions indicated as being performed by separate MLS components may be implemented using shared computing or storage devices—e.g., some devices may be used for storing source code as well as trained models.

According to some embodiments, a client may submit a programmatic request via interfaces 177 enabling the MLS to identify a particular simulator to be used as a source of input and feedback to train an attention-based reinforcement learning model (ARLM) using algorithm 162. The simulator may be selected by the client from among the internal environment simulators 152 (such as a race-track simulator, a flight simulator, or the like) of the MLS, or from among a set of external data sources 131 to which the MLS training resources 154 are provided access in various embodiments. In at least some embodiments, the ARLM may be intended to help plan the navigation or movements of one or more autonomous agents 121 (e.g., 121A or 121B), such as a robot, a vehicle, a drone or the like.

The granularity at which the input data to be used to train the ARLM is provided, as well as the modality of the input data, may vary from one simulator to another. For example, in some embodiments image input data at the pixel level may be used as input for the ARLM; in other embodiments, the input data may include radar, LIDAR, audio, temperature, wind, pressure and/or other types of signals.

Using training input data sets obtained from the selected data source or simulator, an ARLM comprising multiple layers of artificial neurons may be trained in various embodiments on behalf of the MLS client using training resources 154 (which may include one or more computing devices). The ARLM may comprise at least a perception sub-model and a dynamics sub-model in some embodiments, with both sub-models being trained jointly and each sub-model comprising one or more layers of artificial neurons. The perception sub-model, which may comprise one or more attention layers in various embodiments, may learn to generate an internal or latent representation of the environment corresponding to the input received by the ARLM, with respective importance indicators weights being assigned by the attention layers to respective elements or features perceived in the environment. The attention layers may implement a variety of attention mechanisms in different embodiments, such as additive attention sing a multi-layer perceptron (MLP) or multiplicative attention using a dot-product technique.

The dynamics sub-model may be responsible for identifying, using the latent representation and importance indicators, one or more actions to be initiated by an autonomous agent operating in the environment corresponding to the input data, e.g., in according with a reward function or an error function. In one embodiment, the dynamics-sub-model may include its own attention layers, e.g., used in conjunction with a recurrent neural network layer of the dynamics sub-model to assign respective importance indicators to different actions or action combinations. Such attention layers within the dynamics sub-model may in effect be used to refine or combine policies indicating actions to be taken based on the output of the perception sub-model. In some embodiments, an image error function, indicative of a difference between a desired image of the environment and the actual image perceived using the simulator may be used during the training of the ARLM. In at least one embodiment, the image error function may be computed at the pixel level. In some embodiments, only a still image (represented using spherical geometry) may be required as the input for the ARLM, without requiring separate velocity or position input. In some embodiments, the perception sub-model may include one or more convolution layers, with respective attention layers being associated with individual ones of the convolution layers.

A trained version of the ARLM may be stored at a repository 157 in the depicted embodiment, and deployed at the request of an MLS client to one or more autonomous agents 121. There, the trained version of the ARLM may be run, and the output produced by the ARLM may be sent to various types of actuators to cause navigation and/or other types of actions to be initiated. ARLMs trained at the MLS may be deployed to a variety of autonomous agents 121 in different embodiments, including for example agents incorporated within road vehicles, aerial or underwater drones, robots and the like.

According to at least some embodiments, the training of the ARLM may be initiated at the MLS 150 in response to a programmatic training request which indicates client-selected values for various meta-parameters of the training effort. Such meta-parameters may include, among others, (a) the number and types of layers of ARLM, (b) a training termination criterion, (c) a reward function, (d) dimensions of the training input data set, or (e) dimensions of the result to be produced by the ARLM.

In at least one embodiment, MLS clients may be provided visual representations of the internal workings of the ARLM, e.g., during the training or after the training has concluded. Such visual representations may, for example, show (using a heat map or similar mechanism) the relative importance indicators assigned to various features or elements of the environment by the ARLM.

Example ARLM Architecture

Figure 2:
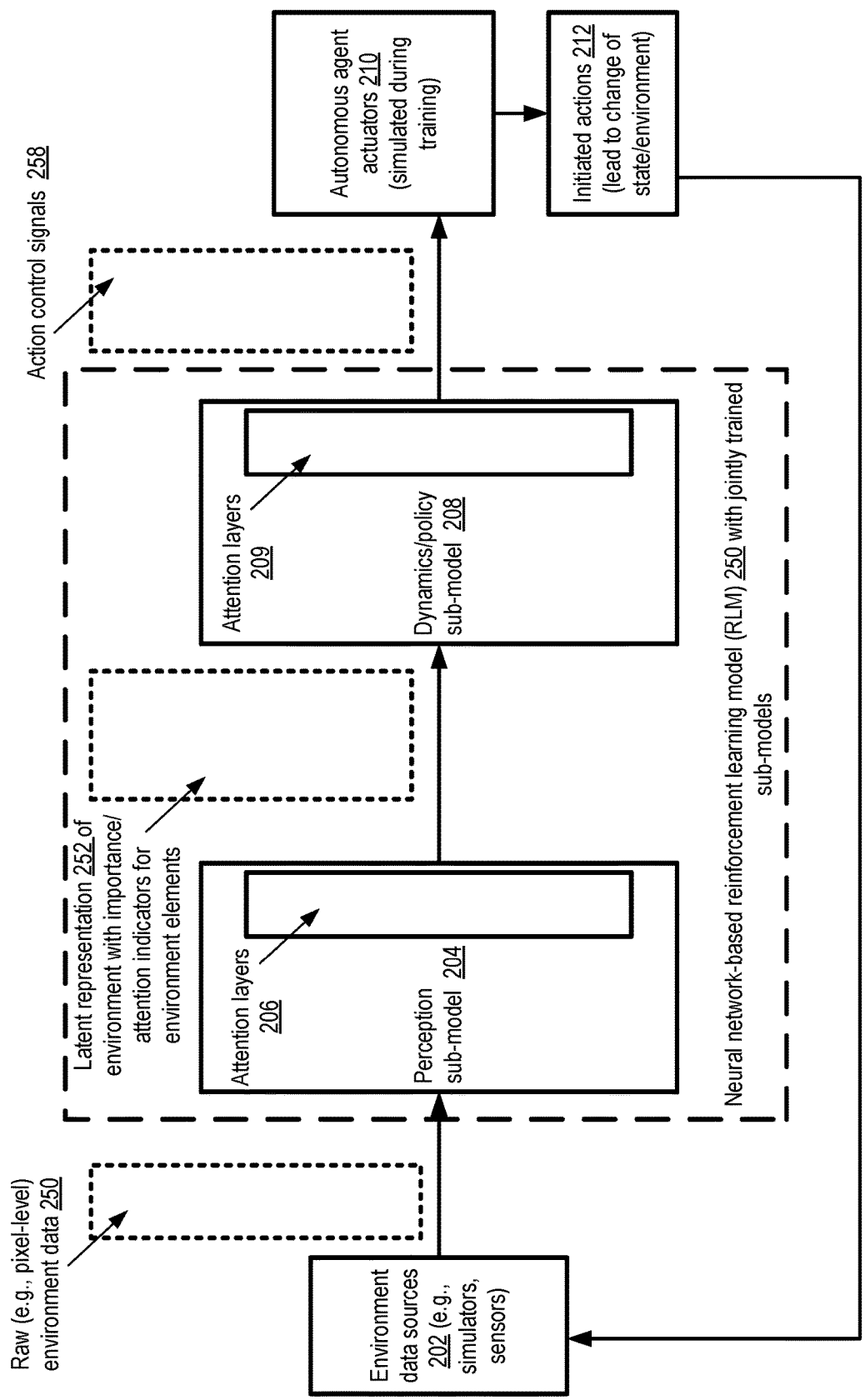
FIG. 2 illustrates an example architecture of an attention-based reinforcement learning model in which a perception sub-model and a dynamic sub-model may be trained jointly, according to at least some embodiments.

FIG. 2 illustrates an example architecture of an attention-based reinforcement learning model in which a perception sub-model and a dynamic sub-model may be trained jointly, according to at least some embodiments. In the depicted embodiment, raw input data 250 for a neural network-based RLM 250 may be obtained from one or more environment data sources 202, such as simulators or sensors. Such environment data 250 may, for example, comprise still images generated using one or more cameras in some embodiments. In some embodiments, the dimensionality or resolution of the image may be among the meta-parameters whose values are selected by a client of an MLS similar to MLS 150 of FIG. 1, on whose behalf the RLM 250 is to be trained.

The raw environment data set may be processed at the perception sub-model 204 of the RLM 250, which may comprise one or more attention layers 206 in the depicted embodiment. Individual ones of the attention layers may be fully-connected in some embodiments to their predecessor layers (e.g., convolution layers as discussed below) so as to capture the environment holistically when assigning importance. The perception sub-model may learn to generate a latent representation 252 of the environment, with respective attention/importance indicators being assigned to various elements of the environment. For example, in a scenario in which the RLM is being trained for navigating a vehicle, different importance indicators may be assigned to detected objects, road boundaries, road dividers, other vehicles, etc.

The dynamics or policy sub-model 208 may consume the latent representation 252 as input, and produce a set of action control signals 258 in the depicted embodiment as output, e.g., based on an error function and/or a reward function specified or approved by the client on whose behalf the RLM is being trained. In some embodiments, a full image error function may be employed to generate the action control signals 258. In some embodiments, the dynamics sub-model may itself include one or more attention layers 209. In various embodiments, attention layers may be incorporated within (a) only the perception sub-model, (b) only the dynamics sub-model or (c) in both the perception sub-model and the dynamics sub-model.

The action control signals 258 may be provided as output to one or more autonomous agent actuators 210 in the depicted embodiments. During training, the actuators may be implemented as part of a simulator in at least some embodiments; after the RLM 250 has been trained and deployed, the action control signals may be transmitted to physical (rather than simulated) actuators such as components of a vehicle's or drone's braking, acceleration and turning mechanisms, components of a robot's motion subsystems, etc. The actions 212 initiated by the actuators 210 based on the signals 258 may lead to a change in the environment or state of the autonomous agent, which may then be captured as part of the input used for further subsequent training of the RLM in various embodiments.

Example ARLM with Convolution Layers

Figure 3:
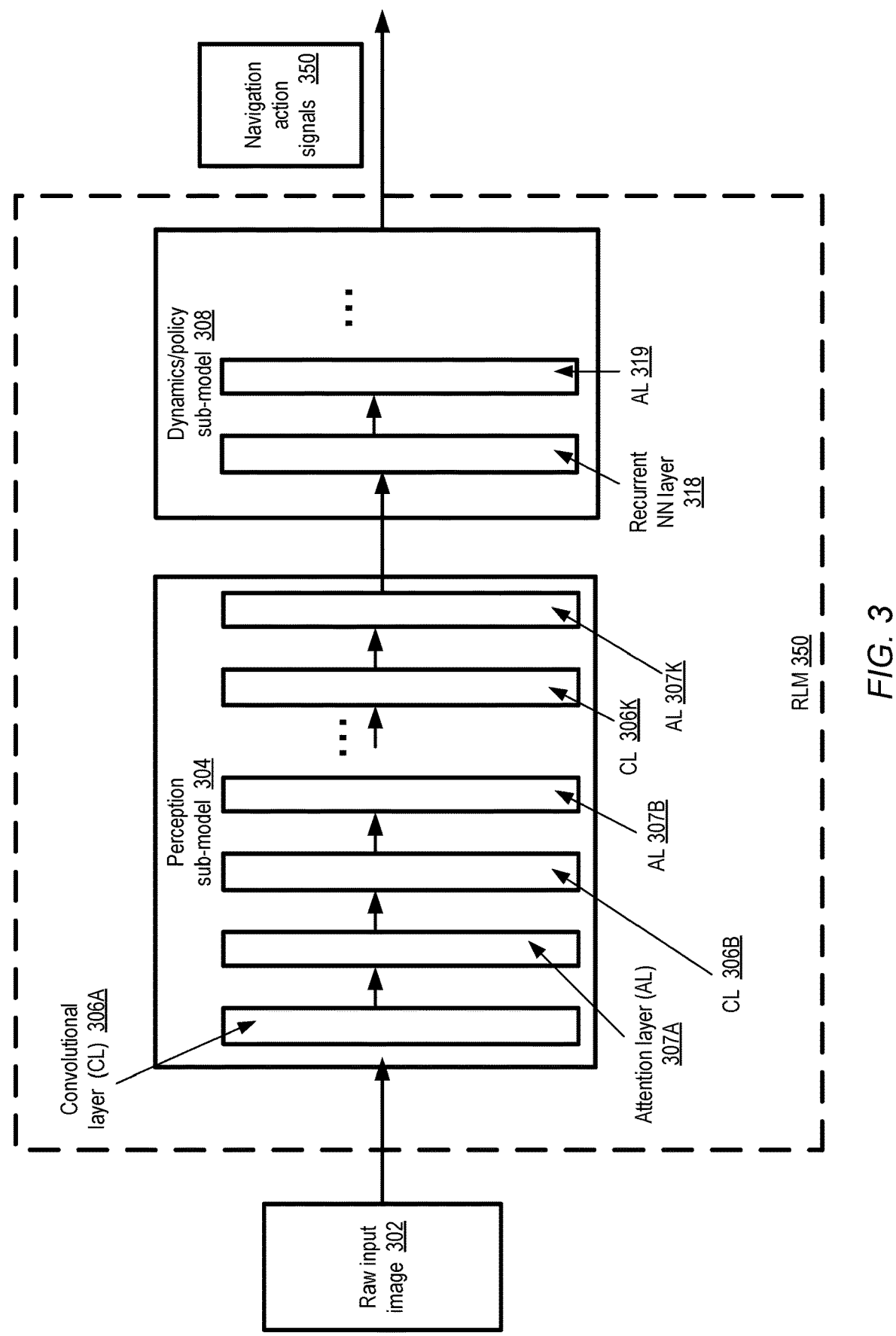
FIG. 3 illustrates an example reinforcement learning model in which convolution layers may be combined with at least one attention layer, according to at least some embodiments.

FIG. 3 illustrates an example reinforcement learning model in which convolution layers may be combined with at least one attention layer, according to at least some embodiments. In the depicted embodiment, perception sub-model 304 of the RLM 350, to which raw input images 302 of the environment may be provided as input, may comprise one or more convolution layers (CLs) 306, such as 306A, 306B, 306K and the like. In some embodiments, the input images may use spherical geometry or spherical coordinates to represent the environment. At a given CL 306, a mathematical operation called convolution may be employed to capture features in the image representation provided as input to that layer. Generally speaking, each artificial neuron in a CL 306 may process input data corresponding to its receptive field, in a manner analogous to biological neurons in animal visual systems. To reduce the computation complexity, in some embodiments "tiles" (e.g., subsets of P×P pixels, where P is a small integer) may be defined at each CL regardless of the overall input image size, and weights may be shared across all the tiles. As the input is processed successively by the different CLs 306, more complex features (e.g., vehicles, trees, etc.) in an input scene may be identified from simpler features (e.g., shapes, edges) identified at an earlier-encountered CL.

In the depicted embodiment, individual ones of the convolution layers 306 may have a corresponding attention layer (AL) to assign importance to different concepts or objects identified in the convolution layer—e.g., an AL 307A may be associated with a CL 306A, AL 307B with CL 306B, AL 307K with CL 306K, and so on. The number of convolution layers 306 and attention layers (as well as various properties of the layers such as the number of artificial neurons per layer) may be selected in some embodiments by a client on whose behalf the RLM 350 is being trained. In other embodiments, at least some of these meta-parameters may be selected by components of a machine learning service without requiring guidance from a client. In some embodiments, alternatives to the architecture shown in FIG. 3 may be employed—e.g., multiple convolution layers may be arranged in a pipeline, and the final convolution layer 306K may be coupled with an attention layer (AL) 307.

In one embodiment, code similar to the example shown below may be used to combine at least one attention layer with a corresponding 2-dimensional convolution layer (as indicated by the term "Conv2d"). Note that although the TensorFlow framework (indicated by the "tf" prefix for some of the function names) is assumed to be used in the example code fragment shown, any appropriate framework or language may be used in different embodiments. Initialization is performed in lines 2-7 of the example code, and a convolution layer is generated in line 10. Importance indicators in the form of attention weights are generated using softmax (line 14) for the scores generated by the 2-dimensional convolution layer followed by a dense layer (lines 11-13), and these weights are in turn used to modify the context vector which is provided as input to the subsequent layer of the model (which may itself be another convolution layer combined with an attention layer, or may be a layer of the dynamics sub-model).

```
-----------Start example convolution + attention code--------------------
1:    class Conv2dWithAttention(object):
2:        def _init_(self, num_filters: int, kernel_size: int, strides: int,
              units: int):
3:            self.num_filters = num_filters
4:            self.kernel_size = kernel_size
5:            self. strides = strides
6:            self.units = units
7:
8:        def _call_(self, input_layer, name: str-None, is_training-None):
9:
10:           conv = tf.layers.conv2d(input_layer, filters=self.num_filters,
                  kernel_size=self.kernel_size, strides=self.strides,
                  data_format='channels_last', name=name)
11:           W1 = Dense(self.units)
12:           V = Dense(1)
13:           score = tf.nn.tanh(W1(conv))
14:           attention_weights = tf.nn.softmax(V(score), axis=1)
15:           context_vector = attention_weights * conv
16:           context_vector = tf.reduce_sum(context_vector, axis=1)
17:           return context_vector
-----------End example convolution + attention code--------------------
```

As discussed earlier, a latent or transformed representation of the external environment, with importance weights assigned to individual elements, may be provided to a dynamics sub-model 308 of the RLM 350 in some embodiments. There, an optimal navigation decision generator comprising one or more layers of artificial neurons may be trained to produce navigation action signals 350 using the importance weights assigned by the attention layers 307 as parameters. In the depicted embodiment, the dynamics sub-model 308 may also include an attention layer 319, which may consume output generated by a recurrent neural network layer 318, and the relative importance indicators generated at the attention layer 319 may be used to identify optimal actions. In some embodiments, multiple recurrent NN layers and/or multiple attention layers may be included in the dynamics sub-model. In at least one embodiment, an attention layer 319 of the dynamics sub-model may consume input generated by a layer other than a recurrent neural network layer (such as a fully-connected layer). In at least some embodiments the dynamics sub-model may use the relative importance values assigned by attention layer 319 to individual actions to identify an optimal combination of actions rather than an individual optimal action.

Consider one example scenario in which the main goal of the RLM 350 is to learn an optimal path navigating through a track using a ground robot or vehicle. In some embodiments, the ground vehicle control may be based only on raw (pixel) image and no other sensors (such as sensors for velocity or position) may be required. Image-based control formulations using constructs from image-based visual servo theory (IBVS) as well as a kinematic model of the vehicle may be used in some embodiments. IBVS methods generally offer advantages in robustness to camera and target calibration errors, resulting in reduced computational complexity. One caveat of classical IBVS approaches is that it is necessary to determine the depth of each visual feature used in the image error criterion independently of the control algorithm. One of the approaches to overcome this problem is to use reinforcement learning as a direct adaptive control method. It can be shown that the IBVS approach for the ground vehicle control problem may be solved in various embodiments if the image geometry used for the input image is spherical (e.g., if the equivalent of a spherical lens is used).

In various embodiments, the problem of ground vehicle navigation or robot navigation may be formulated as a Markov decision process (MDP), and a clipped proximate policy optimization algorithm may be used. In standard policy optimization, the policy to be learned is parametrized by weights and bias parameters of the underlying neural network. In various embodiments in which one or more attention layers are used as shown in FIG. 3, the policy optimization may solve for the full image error in the visual space while learning the optimal actions for navigation. The use of spherical camera geometry and the attention layers may enable the creation of a context vector in the form of a visual error function for controller design, guaranteeing passivity-like properties to be preserved as long as the control actions utilize velocity. As such, in at least some embodiments, the action space may be designed to create a velocity controller along with steering instead of position. In order to overcome variation-related issues (which may arise if there are high variances in manufacturing of the controlled vehicles or robots), noise may be included in the velocity and steering representations in at least some embodiments.

In at least some embodiments, the inclusion of the attention layers along with the convolution layers in the perception sub-model may significantly speed up training, with better performance achieved on domain transfer tasks (e.g., with aspects such as lighting and track texture changed in the track navigation problem). Faster training may be achieved in some embodiments by not randomizing the model and environmental conditions, and allowing the RLM to focus on jointly optimizing for perception and dynamics. In at least some embodiments, unlike in some conventional approaches, no pre-training stage may be required for learning the latent space representation for perception.

In at least one embodiment, the input representing the environment of the agent may be transformed before being passed to a convolution layer. For example, in an embodiment in which the input comprises audio signals, the signals may be transformed to a 2-dimensional data set for use with 2-dimensional convolution layers. In other embodiments, 1-dimensional convolution may be used (along with attention layers) for audio-containing input or other types of input data.

Example Identification of Salient Aspects of Environment Using ARLM

Figure 4:
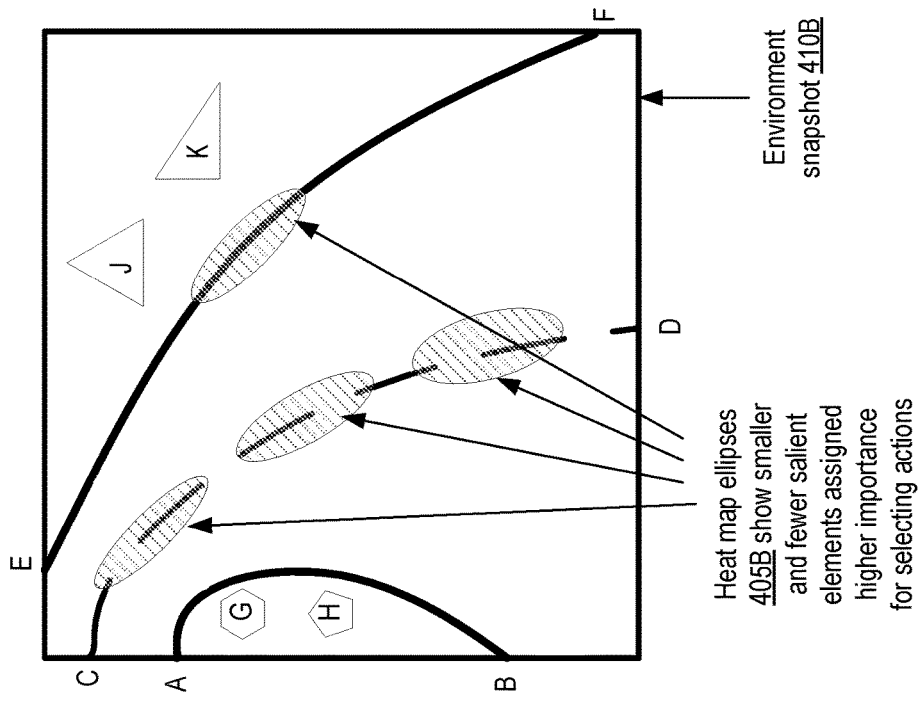
FIG. 4 illustrates an example of the identification of salient aspects of a navigation environment using attention layers of a reinforcement learning model, according to at least some embodiments.
Figure 4:
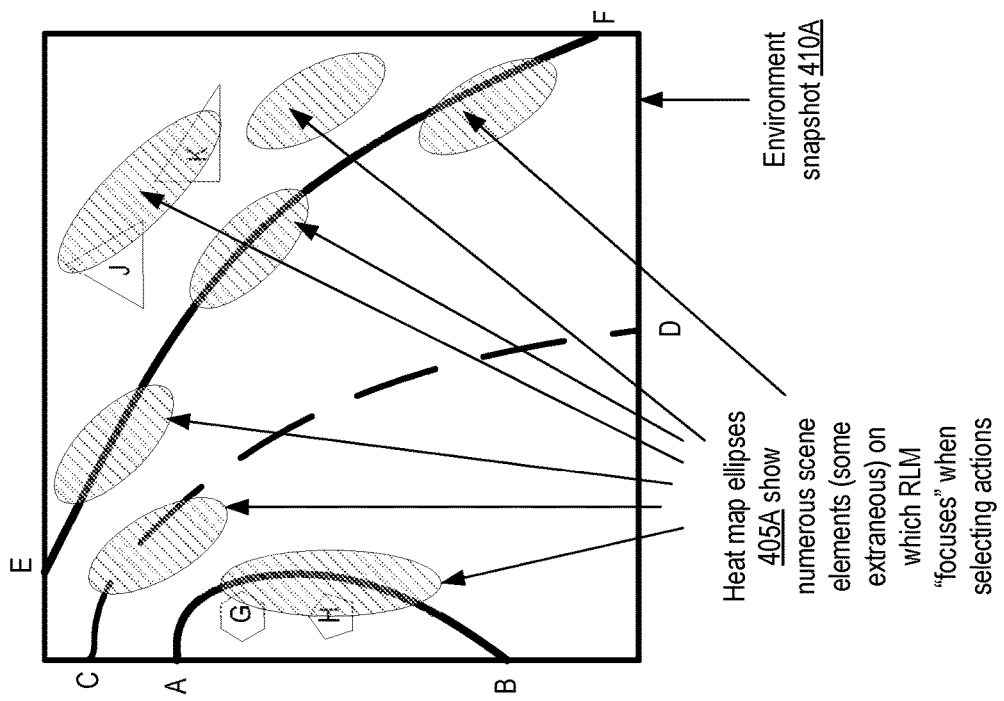

FIG. 4 illustrates an example of the identification of salient aspects of a navigation environment using attention layers of a reinforcement learning model, according to at least some embodiments. In each of the scenarios 1 and 2, a view of the environment of an autonomous vehicle driving along a track is shown, with ellipses (representing hotter portions of heat maps) showing portions of the scene to which greater weight is assigned by an RLM when making navigation decisions. The curve AB represents a left edge of the track, the curve EF shows the right edge of the track, and the dashed curve CD shows a mid-track divider (similar to lane markers on roads). Objects G and H are visible to the left of the track, and objects J and K are visible to the right of the track. Scenario 1, shown on the left of FIG. 4, represents a case in which an attention mechanism is not included in the RLM being used for navigating the vehicle; in scenario 2, shown on the right, attention layers are used in the RLM.

In environment snapshot 410A corresponding to scenario 1, when attention mechanisms are not used, the heat map ellipses 405A show that the RLM focuses on numerous elements of the scene when choosing navigation actions, including for example portions of objects G, H, J and K. In contrast, as shown in snapshot 410B, fewer and smaller salient elements of the environment are identified by the ARLM, as indicated by the ellipses 405B. In effect, the introduction of the attention mechanisms causes the RLM to concentrate on the more truly important aspects of a track (such as the boundaries and the mid-track markers) which are required to ensure that the vehicle completes its circuit without crashing or crossing track boundaries, while ignoring less relevant aspects such as objects J, K, G and H outside the track. In some embodiments, a technique called Gradient-weighted Class Activation Mapping (Grad-CAM) may be used to visualize the impact of using the ARLM on the image space prior to the output layers for control. Grad-CAM may use the gradients of a target concept, flowing into a final convolutional layer, to produce a coarse localization map highlighting the important regions in the image for predicting the concept.

In at least some embodiments, as mentioned earlier, clients of an MLS at which ARLMs are trained may be provided visualizations similar to those shown in FIG. 4, indicating the sub-portions or elements of the environments to which more significance is being assigned in the ARLM. Such visualizations may be provided, for example, in response to programmatic requests submitted during training and/or after the ARLMs have been trained and deployed. In one embodiment, the visualizations of the importance indicators generated by the attention layers may be provided in real time (either during training or during post-training execution). In at least some embodiments, such visualizations (e.g., in the form of a video generated by combining sequences of snapshots similar to snapshots 410) may be provided after the fact instead of or in addition to in real time, e.g., to help interpret the actions taken by the ARLM or to help debug the ARLM.

Example Programmatic Interactions

Figure 5:
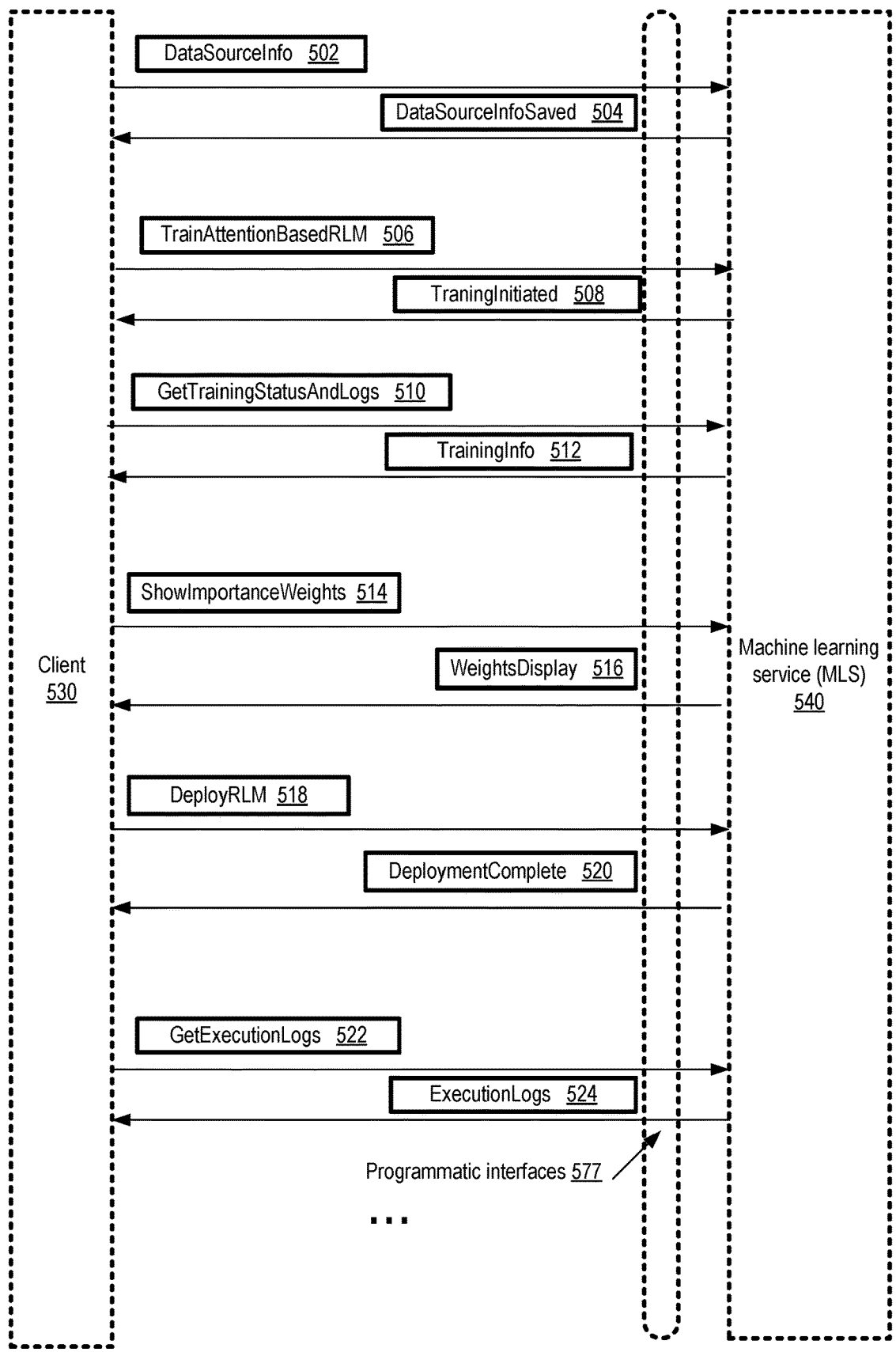
FIG. 5 illustrates example programmatic interactions between a client and a machine learning service at which attention-based reinforcement learning models may be trained, according to at least some embodiments.

FIG. 5 illustrates example programmatic interactions between a client and a machine learning service at which attention-based reinforcement learning models may be trained, according to at least some embodiments. In the depicted embodiment, a machine learning service (MLS) 540 (similar in functionality and features to MLS 150 of FIG. 1) may implement one or more programmatic interfaces 577, such as a web-based console, a set of APIs, a graphical user interface, command-line tools and the like. Clients 530 of the MLS may submit various types of messages (e.g., comprising requests or queries pertaining to machine learning models) to the MLS via the interfaces 577, and receive corresponding responses via the interfaces in at least one embodiment.

A client 530 may submit information about one or more simulators to be used to train an attention-based reinforcement learning model (ARLM) prior to initiating the training of the model in some embodiments, e.g., via a DataSourceInfo message 502. The DataSourceInfo message 502 may, for example, include the source code for a simulator, or a pointer to a network location at which a simulator may be accessed. In at least some embodiments, the same simulator may be used for training multiple ARLMs, or multiple simulators may be used to train a given ARLM; as such, using separate programmatic interactions to specify the simulators from those used to initiate the training may be beneficial. The MLS may store the provided information about feedback data sources and send a DataSourceInfoSaved message 504 to the client 530 in at least one embodiment.

A TrainAttentionBasedRLM request 506 may be submitted by the client 530 in some embodiments to start the training of a particular ARLM using one or more simulators or other data sources. In response, the MLS may initiate the training iterations of the model, and transmit a TrainingInitiated messages 508 to the client. The TrainAttentionBasedRLM request 506 may include various parameters, e.g., indicating the type of computing resources (such as GPU-equipped virtual or physical machines) to be used, the number of training iterations to be performed, as well as the simulator to be used in some embodiments. In at least some embodiments, the request 506 may include the number of layers of the ARLM, as well as the types of layers (e.g., convolutional layers, layers that analyze audio input, layers that analyze other types of input including weather data, etc.) at the perception and policy sub-models, the reward or error function to be used, and so on. In one embodiment, a client 530 may submit source code of the ARLM to the MLS, e.g., in the TrainAttentionBasedRLM request 506 or in a separate interaction. In one embodiment, a simulator to be used for obtaining input for the model training may be run using a different set of computing devices than the set used for the training itself (e.g., a device that does not include GPUs may be used for the simulator, while a device that does include GPUs may be used for the training), and the types of devices to be used for the simulator and the training may be indicated in the training request 506.

In some embodiments, while the training of a given ARLM is underway (or after the training is completed), a client may submit a GetTrainingStatusAndLogs request 510 via interfaces 577, and receive a corresponding response in the form of a TrainingInfo message 512. The status information contained in the TrainingInfo may indicate, for example, how many training iterations have been completed, the rewards associated with various iterations, and so on.

In some embodiments, a client 530 may submit a programmatic ShowImportanceWeights request 514 to obtain a visual or text-based representation of the relative significance assigned to different parts of the environment by one or more attention layers. In the depicted embodiment, a WeightsDisplay response 516 may be presented to the client, highlighting the important parts of the environment, e.g., using a technique similar to the Grad-CAM technique discussed in the context of FIG. 4. In at least some embodiments, the ShowImportanceWeights request or its equivalent may be submitted during training and/or after the trained model has been deployed (e.g., to view the relative importance information generated during execution of the trained model). In at least one embodiment, the importance data may be presented in real time or in near real time; in other embodiments, the importance data may be presented asynchronously with the training or execution of the model, so as not to cause excessive overhead with respect to the training or execution.

After the ARLM has been trained, in at least some embodiments, a DeployRLM request 518 may be submitted via interfaces 577, indicating the particular ARLM to be transmitted to a target deployment destination (e.g., an autonomous agent such as a robot, drone or vehicle). After the model has been deployed to the specified destination, in at least some embodiments a DeploymentComplete message 520 may be sent to the client. In some embodiments, the trained ALRM may generate log records during execution at the deployment destination, and such logs may in some cases be stored at devices accessible by the MLS. Access to such logs may be provided in one or more ExecutionLogs messages 524 by the MLS in the depicted embodiment, e.g., in response to one or more GetExecutionLogs requests 522. It is noted that in at least some embodiments, programmatic interactions other than those shown in FIG. 5 may be supported by an MLS 540.

Example Deployment Targets and Sensors

Figure 6:
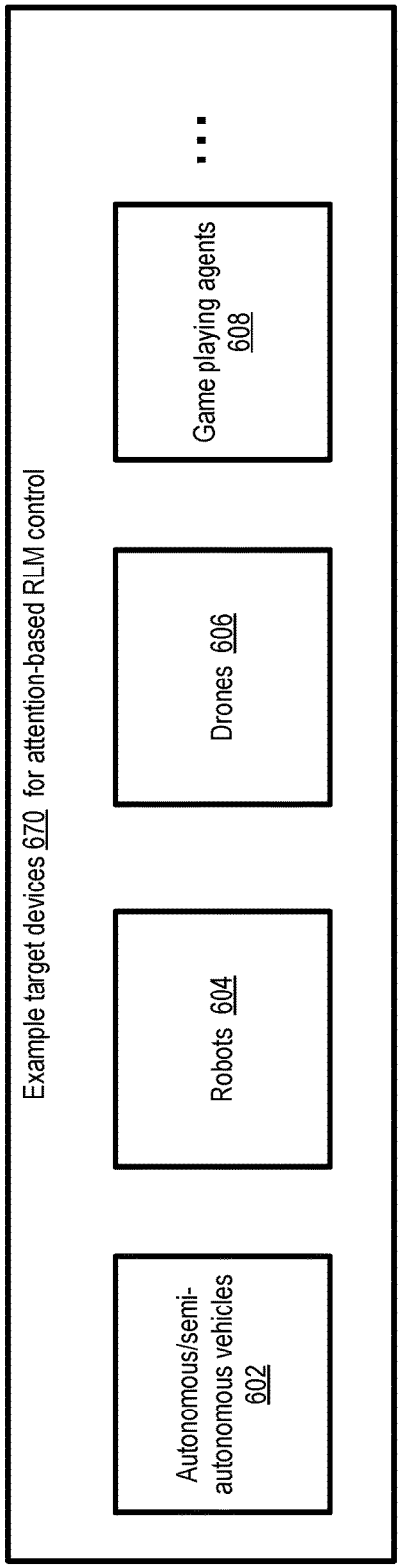
FIG. 6 illustrates example target deployment devices and sensors for attention-based reinforcement learning models, according to at least some embodiments.
Figure 6:
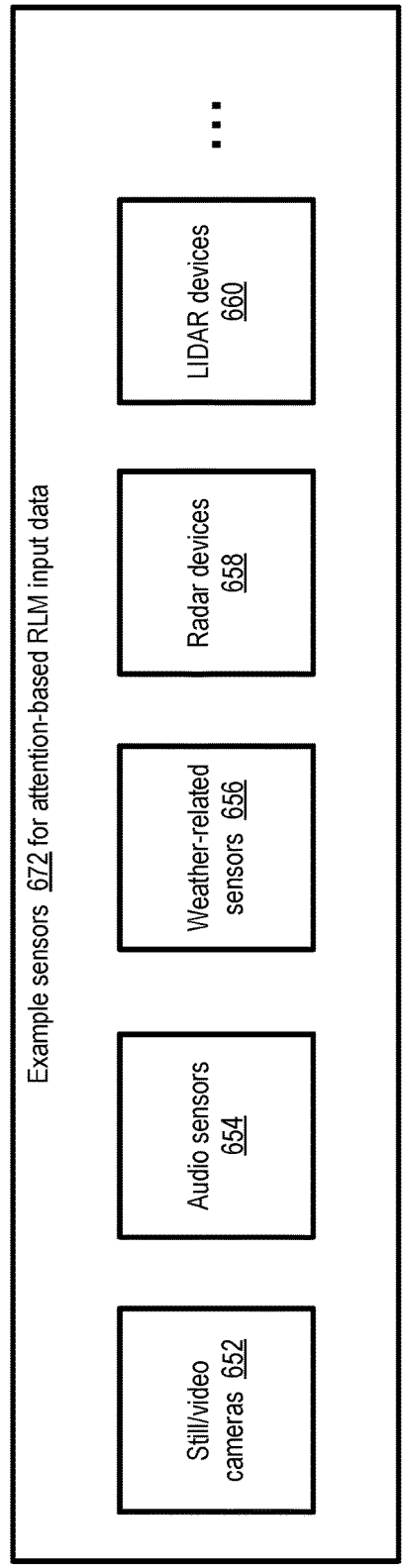

ARLMs trained as described above may be employed to control a wide variety of agents and devices, equipped with any appropriate set of environment sensors, in different embodiments. FIG. 6 illustrates example target deployment devices and sensors for attention-based reinforcement learning models, according to at least some embodiments.

As shown, example target devices 670 for attention-based RLM control may include, among others, autonomous and semi-autonomous vehicles 602, robots 604 (e.g., including industrial robots, environmental robots, home-use robots and the like), drones 606, and/or game playing agent devices 608. Example sensors 672 from which data about the environment of an agent may be obtained may include, among others, still/video cameras 652, audio sensors 654, weather-relate sensors 656 (e.g., ambient temperature sensors, wind speed sensors, air pressure sensors), radar devices 658, LIDAR devices 660, and the like in different embodiments.

In at least some embodiments in which convolution layers are combined with attention layers as discussed earlier, signals generated the different types of sensors may be pre-processed or transformed to produce input suitable for consumption at a convolution layer. Convolution layers of varying dimensionalities may be used to process the signal data in different embodiments—e.g., 2-dimensional convolution layers may be used in some embodiments, while 1-dimensional convolution layers may be used in other embodiments. In embodiments in which simulators are used to provide feedback about the environment of the agent for which an ARLM is being trained, the simulator may include components representing various ones of the sensors. Other types of deployment targets and sensors than those indicated in FIG. 6 may be used in some embodiments.

Example Provider Network Environment

Figure 7:
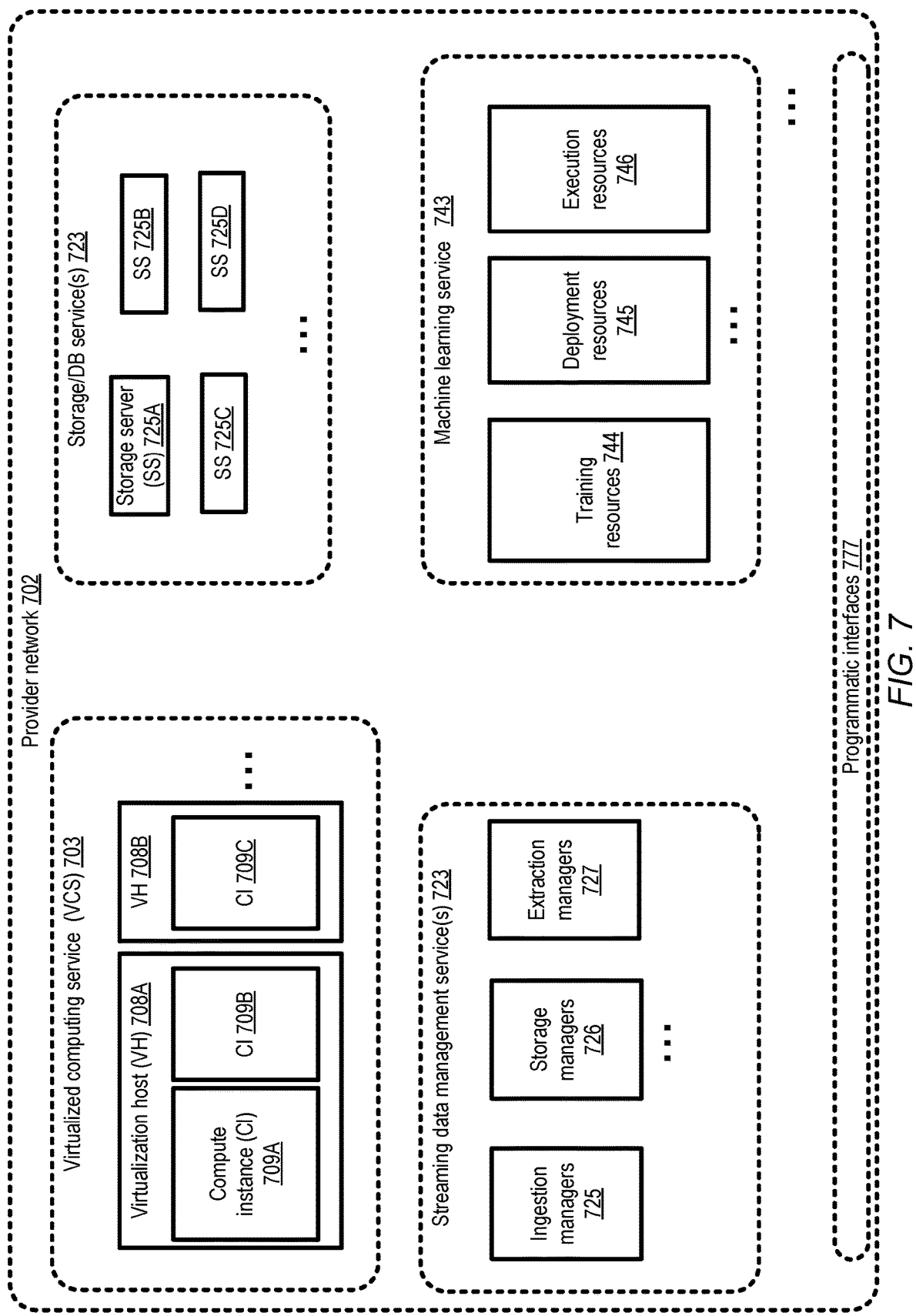
FIG. 7 illustrates an example provider network environment at which a machine learning service may be implemented, according to at least some embodiments.

FIG. 7 illustrates an example provider network environment at which a machine learning service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network, or even a given service of a provider network, may in some cases be distributed across multiple data centers, which in turn may be distributed among numerous geographical regions (e.g., with each region corresponding to one or more cities, states or countries).

In the depicted embodiment, provider network 701 may comprise resources used to implement a plurality of services, including for example a virtualized computing service (VCS) 703, one or more storage or database service 723, a streaming data management service 723 and a machine learning service 743. Each of the services may include a respective set of computing devices and/or other resources in some embodiments. Components of a given service may utilize components of other services in the depicted embodiment—e.g., compute instances (CIs) 709A or 709B, implemented at virtualization hosts such as 708A or 708B of the virtualized computing service 703 and/or storage servers 725 (e.g., 725A-725D0 of the storage and database services may be employed by training resources 744, deployment resources 745 or execution resources 746 of the machine learning service 743. Individual ones of the services shown in FIG. 7 may implement a respective set of programmatic interfaces 777 which can be used by external and/or internal clients (where the internal clients may comprise components of other services) in the depicted embodiment. Data captured at the streaming data management service(s) 723, e.g., with the help of ingestion managers 725, and stored by storage managers 726 may be extracted with the help of extraction managers 727 and used to train and/or test machine learning models at the machine learning service 743 in some embodiments.

The machine learning service 743 may be used to train attention-based reinforcement learning models for autonomous agents in the depicted embodiment, e.g., using joint training of perception and dynamics sub-models similar to those discussed earlier. In some embodiments, simulators for the environments of the agents may be implemented using one category of compute instances 709 (e.g., compute instances running on virtualization hosts that may not include GPUs), while the models may be trained at other types of compute instances (e.g., instances running on virtualization hosts with GPUs). In one embodiments logging output generated by ARLMs trained at the machine learning service 743 may be stored at servers 725 of the storage service 723, and representations of the logged information (including for example visualizations of the relative importance indicators generated by the attention layers) may be generated using compute instances of the VCS 703. In some embodiments, ARLMs may be trained using resources that are not necessarily part of a provider network—e.g., simulators may be run at client data centers.

Methods for Generating and Deploying ARLMs

Figure 8:
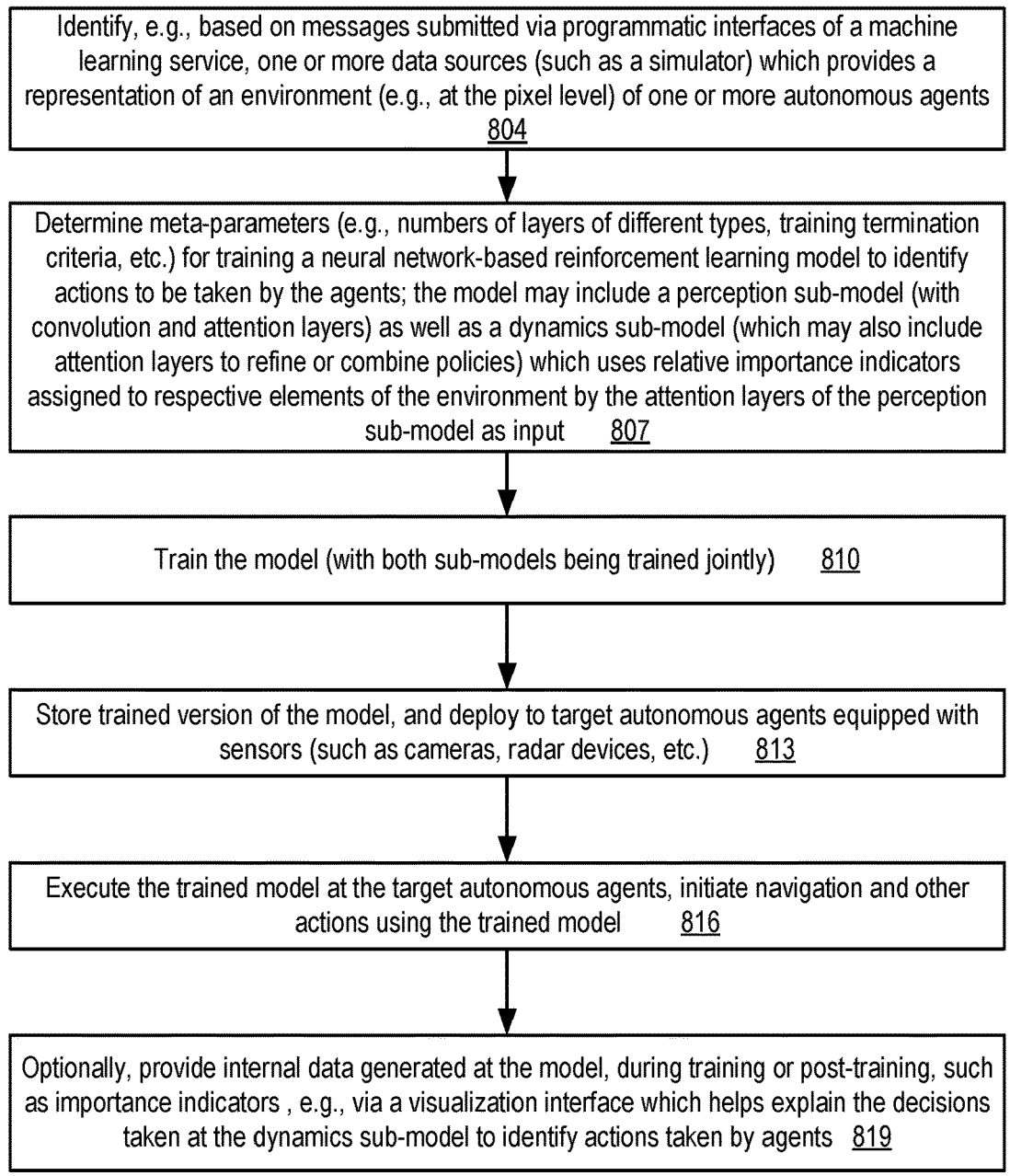
FIG. 8 is a flow diagram illustrating aspects of operations that may be performed at a machine learning service usable to train and deploy attention-based reinforcement learning models, according to at least some embodiments.

FIG. 8 is a flow diagram illustrating aspects of operations that may be performed at a machine learning service usable to train and deploy attention-based reinforcement learning models, according to at least some embodiments. As shown in element 804, one or more data sources (such as simulators) which can provide representations of the environment of one or more autonomous agents (such as an autonomous robot or vehicle) may be identified, e.g., based on programmatic interactions between a client and a machine learning service similar in features and functionality to MLS 150 of FIG. 1. In some embodiments, the MLS may be implemented at a provider network which also provides access to one or more simulators, and such simulators may be identified programmatically for the purpose of training a model.

Values for a set of meta-parameters for training a neural-network based reinforcement learning model may be determined (element 807), e.g., via one or more additional programmatic interactions with a client in the depicted embodiment. A variety of different meta-parameters may be specified by an MLS client in some embodiments, including for example the numbers and sizes of various layers of the model, training termination criteria, a reward function, dimensions of the training data set to be used, or dimensions of the result to be produced by the model. The model may include a jointly-trained pair of sub-models in some embodiments: a perception sub-model which may include one or more attention layers, and a dynamics or policy sub-model. The attention layers of the perception sub-model may generate respective importance indicators for various elements or objects identified in the environment of the agent, and the importance identifiers may then be used (along with other output produced by the perception sub-model) at the dynamics sub-model to identify actions to be taken by the agent. In some embodiments, the perception sub-model may include convolution layers, e.g., with the output of individual convolution layers being consumed as input by respective attention layers. In some embodiments, the dynamics sub-model may include one or more attention layers, e.g., instead of or in addition to the attention layers included in the perception sub-model. At the attention layer(s) of such a dynamics sub-model, the relative importance indicators generated may be used to refine or combine actions to be taken by the agent in some embodiments. In some embodiments, the training data set may be multi-modal, e.g., comprising a visual representation of the environment at the pixel level, an audio representation, as well as representations of weather (such as wind, temperature and the like). In at least one embodiment, the training data may not include velocity data or position data of the agent, as a pixel-level visual representation of the environment (e.g., expressed using spherical geometry) may be sufficient to train the model. Any of a variety of attention mechanisms may be implemented at the attention layers in some embodiments, including for example multi-layer perceptrons (MLPs), dot-product attention mechanisms, and the like The model may then be trained (element 810), e.g., using resources of the machine learning service and the meta-parameter values that were determined, with both sub-models being trained together. This joint training may avoid some of the problems, (including potentially larger computational and memory requirements) of other approaches towards autonomous agent control, in which a perception model may be trained independently from a dynamics model.

The trained version of the model may be stored, and deployed or transmitted to one or more target autonomous agents (element 813), e.g., in accordance with a programmatic request from a client in some embodiments. The targeted agents may be equipped with, or have access to data generated by, a variety of sensors in different embodiments, including for example cameras, radar devices, LIDAR devices and the like. Such sensor-provided data may replace the simulator's representations of the environment at model run-time.

The trained model may be executed at the target autonomous agents, e.g., to initiate navigation actions and/or other types of actions (such as, for example, picking up an object using a robot's arms, moving an object, initiating a move in a game, etc.) in a non-simulation or real-world environment (element 816). Optionally, in some embodiments, internal data generated within the model (either during training or in the post-training execution of the models) may be presented to users or clients of the MLS. For example, the importance indicators generated by the attention layers may be presented via a visualization interface similar to the heat maps discussed earlier. Such internal data may be helpful in explaining the decisions taken within the model (e.g., at the dynamic sub-model) to identify the actions to be initiated, or in debugging/improving the model.

It is noted that in various embodiments, some of the operations shown in FIG. FIG. 8 may be implemented in a different order than that shown in the figure, or may be performed in parallel rather than sequentially. Additionally, some of the operations shown in FIG. 8 may not be required in one or more implementations.

Use Cases

The techniques described above, of training and deploying deep reinforcement learning models with attention layers, may be beneficial in a variety of scenarios. Deep neural network models have been shown to be remarkably effective in a variety of scenarios, from game playing to object recognition. Many deep reinforcement learning models may be trained using simulators, as it may be impractical to train the models in real-world scenarios where complex and potentially dangerous actions may be taken using the models. By introducing the attention layers into the models, it may become much easier to train the models to focus on important aspects of an autonomous agent's environment (such as the boundaries or center-line markings of a road, in the case of an autonomous vehicle scenario) when identifying actions to be implemented, instead of less relevant details (e.g., the sizes and locations of buildings at some distance from the road). Such aspects are more likely to remain invariant between the training environment and the deployment environment of the models, and thus recognizing and granting greater significance to such aspects may make the models much more adaptable to changing environment details. As a result of the use of the attention layers, the resources required to train effective RLMs for complex tasks such as autonomous agent navigation may be greatly reduced. Furthermore, the interpretability of the models may be enhanced by providing visual evidence of the different levels of importance assigned by the attention layers to respective elements of the environment.

Illustrative Computer System

Figure 9:
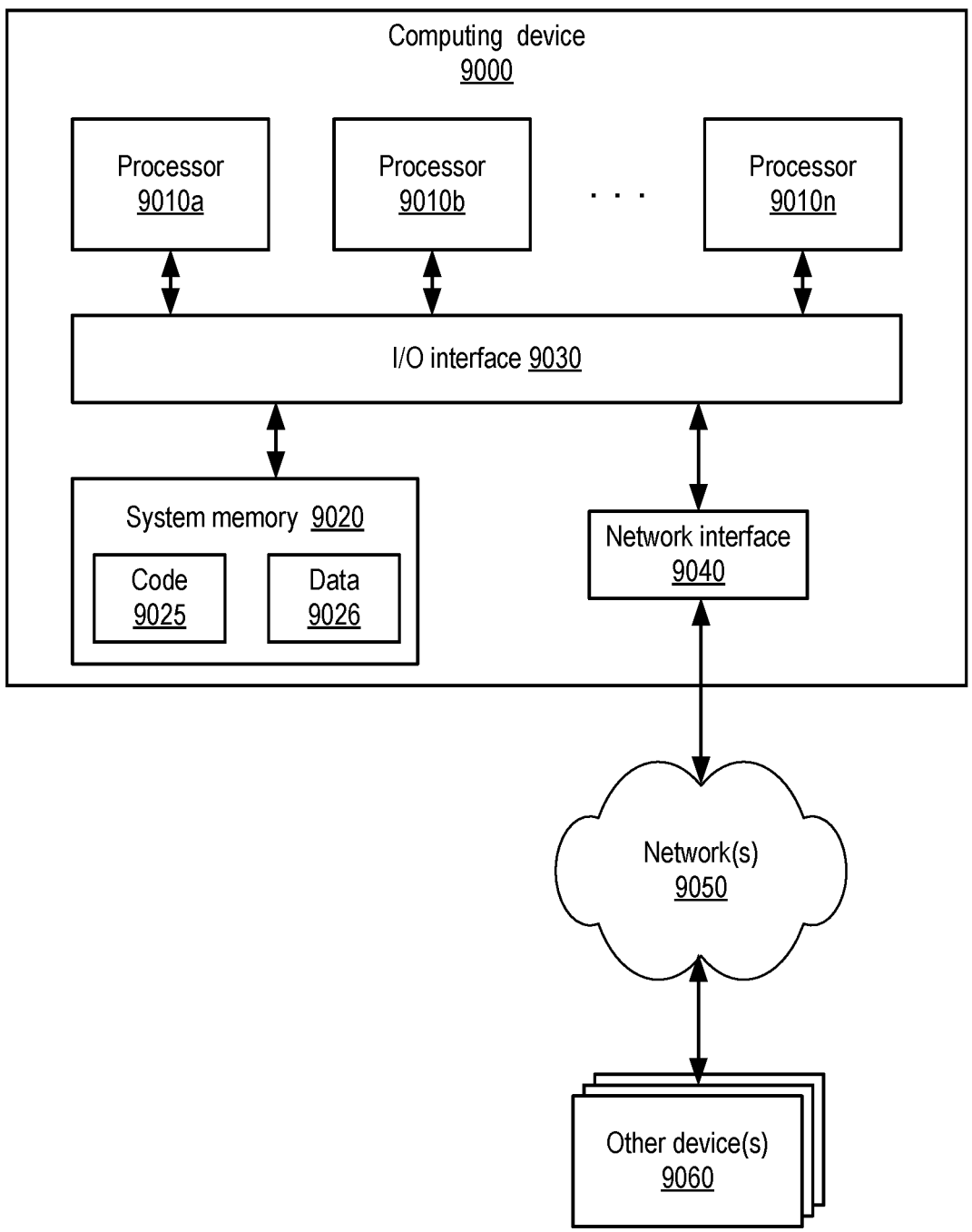
FIG. 9 is a block diagram illustrating an example computing device that may be used in at least some embodiments.

In at least some embodiments, a server that implements a portion or all of one or more of the technologies described herein, including the techniques for various elements of a machine learning service, data sources for such services, autonomous agents, and the like may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across one or more processors cause the one or more computing devices to:
identify, based at least in part on a first programmatic interaction, a first simulator of an environment of one or more autonomous agents;
train, using at least a pixel-level data set obtained from the first simulator as input, a neural network-based reinforcement learning model, wherein the neural network-based reinforcement learning model includes at least (a) a perception sub-model with one or more convolution layers and one or more attention layers and (b) a dynamics sub-model, wherein the perception sub-model is trained jointly with the dynamics sub-model, wherein the dynamics sub-model identifies one or more actions resulting in a change in vehicle motion to be initiated by an autonomous agent based on output generated by the perception sub-model, wherein the output comprises relative importance indicators assigned to respective elements of the environment, and wherein the relative importance indicators are determined by the one or more attention layers;
store a trained version of the neural network-based reinforcement learning model; and
transmit, based at least in part on a second programmatic interaction, the trained version of the neural network-based reinforcement learning model to a target autonomous agent, wherein one or more actions of the target autonomous agent within a non-simulation environment are initiated using the trained version of the neural network-based reinforcement learning model, and wherein at least one action of the one or more actions results in a change in motion of a vehicle at least partially controlled by the target autonomous agent.

2. The system as recited in claim 1, wherein the trained version of the neural network-based reinforcement learning model is configured to:
obtain, as input in the non-simulation environment, representations of data generated by one or more sensors, wherein the one or more sensors comprise one or more of: (a) a still camera, (b) a video camera, (c) a radar device, (d) a LIDAR device, (e) an audio signal sensor, or (f) a weather-related sensor.

3. The system as recited in claim 1, wherein the one or more computing devices include further instructions that upon execution on or across one or more processors further cause the one or more computing devices to:
receive, prior to the training, via a programmatic interface of a network-accessible machine learning service, indications of one or more of: (a) a number of layers of the neural network-based reinforcement learning model, (b) a training termination criterion, (c) a reward function, (d) dimensions of the training data set, or (e) dimensions of the result to be produced by the neural network-based reinforcement learning model.

4. The system as recited in claim 1, wherein the one or more computing devices include further instructions that upon execution on or across one or more processors further cause the one or more computing devices to:

provide, via one or more visualization interfaces, a representation of at least one importance indicator determined by the one or more attention layers.

5. The system as recited in claim 1, wherein the input to train the neural network-based reinforcement learning model does not include (a) velocity data and (b) position data, and wherein the geometry of the pixel-level data set is spherical.

6. A method, comprising:

performing, by one or more computing devices:
identifying a data source which provides a representation of a non-simulation environment of one or more autonomous agents;
training, using a data set obtained at least in part from the data source, a neural network-based reinforcement learning model, wherein the neural network-based reinforcement learning model includes a subcomponent comprising one or more attention layers configured to assign relative importance indicators to respective elements of the non-simulation environment, and wherein the relative importance indicators are used at one or more other sub-components of the neural network-based reinforcement learning model to identify one or more actions that cause, at least in part, an autonomous agent to initiate a change in vehicle motion, wherein the subcomponent comprising one or more attention layers is trained jointly with the one or more other sub-components of the neural network-based reinforcement learning model that identifies the one or more actions;
storing a trained version of the neural network-based reinforcement learning model; and
transmitting the trained version of the neural network-based reinforcement learning model to a target autonomous agent, wherein one or more actions of the target autonomous agent within the non-simulation environment are initiated using the trained version of the neural network-based reinforcement learning model, and wherein at least one action of the one or more actions cause, at least in part, the change in vehicle motion.

7. The method as recited in claim 6, wherein at least one action of the one or more actions resulting in the change in vehicle motion comprises: (a) a movement of a road vehicle, (b) a movement of a robotic device, (c) a movement of a drone, or (d) initiating a move in a game comprising the vehicle.

8. The method as recited in claim 6, further comprising:
providing, as input to the trained version of the neural network-based reinforcement learning model during execution, representations of data generated by one or more sensors associated with a particular autonomous agent, wherein the one or more sensors comprise one or more of: (a) a still camera, (b) a video camera, (c) a radar device, (d) a LIDAR device, (e) an audio signal sensor, or (f) a weather-related sensor.

9. The method as recited in claim 6, wherein the neural network-based reinforcement learning model comprises a perception sub-model and a dynamics sub-model, wherein the one or more attention layers are associated with the perception sub-model, and wherein the perception sub-model and the dynamics sub-model are trained jointly.

10. The method as recited in claim 6, wherein the neural network-based reinforcement learning model comprises at least one convolution layer whose output is provided to a particular attention layer of the one or more attention layers.

11. The method as recited in claim 6, further comprising performing, by the one or more computing devices:
receiving, via a programmatic interface of a network-accessible machine learning service of a provider network, a training request for the neural network-based reinforcement learning model, wherein the training is initiated in response to the training request.

12. The method as recited in claim 6, further comprising performing, by the one or more computing devices:
receiving, prior to the training, via a programmatic interface of a network-accessible machine learning service of a provider network, indications of one or more of: (a) a number of layers of the neural network-based reinforcement learning model, (b) a training termination criterion, (c) a reward function, (d) dimensions of the training data set, or (e) dimensions of the result to be produced by the neural network-based reinforcement learning model.

13. The method as recited in claim 6, further comprising performing, by the one or more computing devices:
providing, via one or more visualization interfaces, a representation of at least one importance indicator produced by the one or more attention layers.

14. The method as recited in claim 6, wherein the first data source comprises a simulator running at one or more computing resources of a provider network.

15. The method as recited in claim 6, further comprising:
transmitting, in response to a programmatic request, the trained version of the neural network-based reinforcement learning model to a deployment destination associated with a particular autonomous agent.

16. One or more non-transitory computer-accessible storage media storing program instructions that when executed on or across one or more processors cause one or more computer systems to:
identify a first data source configured to provide a representation of a non-simulation environment of one or more autonomous agents;
train, using a data set obtained at least in part from the first data source, a neural network-based reinforcement learning model, wherein the neural network-based reinforcement learning model includes a subcomponent comprising one or more attention layers configured to assign importance indicators to respective elements of the non-simulation environment, wherein one or more of the importance indicators produced by the one or more attention layers are used at one or more other sub-components of the neural network-based reinforcement learning model to identify one or more actions that cause, at least in part, an autonomous agent to initiate a change in vehicle motion, wherein the subcomponent comprising one or more attention layers is trained jointly with the one or more other sub-components of the neural network-based reinforcement learning model that identifies the one or more actions;
store a trained version of the neural network-based reinforcement learning model and
transmit the trained version of the neural network-based reinforcement learning model to a target autonomous agent, wherein one or more actions of the target autonomous agent within the non-simulation environment are initiated using the trained version of the neural network-based reinforcement learning model, and wherein at least one action of the one or more actions cause, at least in part, the change in vehicle motion.

17. The one or more non-transitory computer-accessible storage media as recited in claim 16, wherein the neural network-based reinforcement learning model comprises a perception sub-model and a dynamics sub-model, and wherein the one or more actions resulting in the change in vehicle motion to be initiated by the agent are identified based at least in part on (a) output generated by the perception sub-model and consumed as input by the dynamics sub-model and (b) an importance indicator generated by an attention layer included in the dynamics sub-model.

18. The one or more non-transitory computer-accessible storage media as recited in claim 16, wherein an attention layer of the one or more attention layers utilizes one of: (a) a multi-layer perceptron (MLP) attention mechanism or (b) dot-product attention.

19. The one or more non-transitory computer-accessible storage media as recited in claim 16, wherein to identify the one or more actions, at least one pixel-level image error function is computed in the neural network-based reinforcement learning model.

20. The one or more non-transitory computer-accessible storage media as recited in claim 16, wherein the data set comprises one or more of: (a) a visual representation of at least a portion of the environment, (b) an audio representation of at least a portion of the environment, (c) a representation of a weather-related property of the environment.

* * * * *